(12) United States Patent
Sela (10) Patent No.: US 9,883,452 B2
(45) Date of Patent: *Jan. 30, 2018

(54) COMMUNICATION SYSTEM FOR REDUCING THE EFFECTS OF RADIATION EMITTED FROM CELLULAR PHONE ANTENNAS

(71) Applicant: Nisim Sela, Herzliya (IL)

(72) Inventor: Nisim Sela, Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,922

(22) Filed: May 18, 2015

(65) Prior Publication Data

US 2015/0249494 A1 Sep. 3, 2015

Related U.S. Application Data

(63) Continuation-in-part of application No. 12/064,281, filed as application No. PCT/IL2006/000971 on Aug. 21, 2006, now Pat. No. 9,037,191.

(30) Foreign Application Priority Data

Aug. 22, 2005 (IL) .......................................... 170435

(51) Int. Cl.
*H04W 48/20* (2009.01)
*H04W 88/06* (2009.01)
(Continued)

(52) U.S. Cl.
CPC ........ *H04W 48/20* (2013.01); *H04B 7/15507* (2013.01); *H04W 4/008* (2013.01);
(Continued)

(58) Field of Classification Search
CPC ....... H04W 88/06; H04W 4/02; H04W 48/16; H04W 64/006; H04W 72/04;
(Continued)

(56) References Cited

U.S. PATENT DOCUMENTS 5,956,651 A 9/1999 Willkie et al.
5,956,653 A 9/1999 Lahti
(Continued)

FOREIGN PATENT DOCUMENTS

GB 3 377 788 A 1/2003
JP 11-205443 A 7/1999
(Continued)

OTHER PUBLICATIONS

Israel Office Action for corresponding Israel Patent Application No. 170435 dated Jun. 27, 2013.
(Continued)

*Primary Examiner* — Olumide T Ajibade Akonai
(74) *Attorney, Agent, or Firm* — Merchant & Gould P.C.

(57) ABSTRACT

A cellular communication system which comprises a cellphone interface unit that includes a transceiver for low power RF communication; a microphone; an earphone; a display; a keypad; a hub device that includes a transceiver for low power RF communication; an antenna for high power RF communication and circuitry and appropriate software components for establishing a communication channel between the hub and a base station.

22 Claims, 10 Drawing Sheets

(51) Int. Cl.
*H04W 4/00* (2009.01)
*H04B 7/155* (2006.01)
*H04W 8/00* (2009.01)

(52) U.S. Cl.
CPC ............ *H04W 8/005* (2013.01); *H04W 88/06* (2013.01); *Y02B 60/50* (2013.01)

(58) Field of Classification Search
CPC ..... H04W 88/04; H04W 4/008; H04W 88/10; H04W 48/18; H04W 4/22; H04W 84/18; Y02B 60/50
USPC ........... 455/7, 11.1, 41.1, 41.2, 550.1, 552.1, 455/553.1, 558
See application file for complete search history.

(56) References Cited

U.S. PATENT DOCUMENTS

| | | |
|---|---|---|
| 6,131,040 A | 10/2000 | Phillips |
| 6,134,437 A | 10/2000 | Karabinis et al. |
| 6,240,301 B1 | 5/2001 | Phillips |
| 7,031,657 B2 | 4/2006 | Tehrani |
| 7,257,372 B2 | 8/2007 | Kaltenbach et al. |
| 7,483,679 B2 | 1/2009 | Kurobe et al. |
| 7,565,187 B1 | 7/2009 | Dynok et al. |
| 7,715,830 B2 | 5/2010 | Cocita |
| 7,738,411 B2 | 6/2010 | Koponen et al. |
| 2001/0033228 A1 | 10/2001 | Kisreman et al. |
| 2002/0085511 A1 | 7/2002 | Koponen et al. |
| 2003/0043037 A1 | 3/2003 | Lay |
| 2003/0083058 A1 | 5/2003 | Mayer |
| 2003/0232597 A1 | 12/2003 | Mayer |
| 2004/0192228 A1 | 9/2004 | Yamamoto et al. |
| 2005/0041015 A1* | 2/2005 | Kohda ............... G06F 17/30265 345/156 |
| 2006/0022822 A1 | 2/2006 | Wong et al. |
| 2007/0291703 A1 | 12/2007 | Muller |
| 2012/0034865 A1* | 2/2012 | Seki ....................... H04B 7/155 455/7 |
| 2012/0165006 A1* | 6/2012 | Ge ........................ H04W 88/04 455/423 |
| 2012/0322502 A1* | 12/2012 | Song ..................... H04W 36/14 455/553.1 |

FOREIGN PATENT DOCUMENTS

| | | |
|---|---|---|
| JP | 2002-247233 A | 8/2002 |
| JP | 2004-535627 A | 11/2004 |
| WO | WO 02/091704 A2 | 11/2002 |
| WO | 2005/029890 A1 | 3/2005 |

OTHER PUBLICATIONS

Japanese Notification of Reasons for Refusal for corresponding Japanese Patent Application No. 2008-527591 dated Apr. 9, 2012.
European Office Action for corresponding European Patent Application No. 06796062.5 dated Oct. 20, 2016, 5 pgs.

* cited by examiner

COMMUNICATION SYSTEM FOR REDUCING THE EFFECTS OF RADIATION EMITTED FROM CELLULAR PHONE ANTENNAS

This application is a continuation-in-part of U.S. patent application Ser. No. 12/064,281, filed Jul. 25, 2008, which is a national phase application of International Patent Application PCT/IL2006/000971 filed on Aug. 21, 2006, which claims benefit of Israeli Patent Application No. 170435 filed on Aug. 22, 2005 and which applications are incorporated herein by reference. To the extent appropriate, a claim of priority is made to each of the above disclosed applications.

FIELD OF THE INVENTION

The present invention relates in general to cellular phones. In particular, the present invention relates to a communication system for reducing the effects of radiation emitted from cellular phone antennas.

BACKGROUND OF THE INVENTION

Over the past decade or so, people have become more and more accustomed to using and relying on cellular phones as a way of keeping in communication with others. As technology has advanced, cellular phones have become more than mere portable telephones. Today, cellular phones are used for a wide range of functions, including as an organizer, a video camera and a Web browser. Cellular phones generally may also store the contact information, including phone numbers, addresses, etc. of all of a person's friends, relatives and business associates. It is obvious, therefore, that such a device is of extreme importance to its owner. Loss or theft of one's cellular phone may mean the loss of irreplaceable information.

Constant use of cellular phones means frequently removing and replacing the device to and from its storage location, e.g. one's pocket, one's belt or one's purse or bag. Sometimes, for instance, when expecting to receive or to make phone calls, a user may carry the cellular phone in his hand for long periods of time, instead of having to remove and replace the device to and from its storage location. This continual handling of the cellular phone can result in temporarily setting the cellular phone down, e.g. on the table in a restaurant, at a cash register in the supermarket, etc., and not remembering to take it when leaving the location. This is due to the user thinking, consciously or subconsciously, that the cellular phone was in its storage location, when, in fact, it was not.

A dishonest person who finds, or a thief who steals, a cellular phone that does not belong to him, may use the phone to make calls, which would be charged to the cellular phone's owner. He may even utilize the information stored in the phone, for unlawful or damaging purposes. Thus, the owner not only has to deal with replacing all of the lost information stored in his phone, he must additionally deal with any costs incurred by the criminal who obtained and made use of the phone.

Many studies have shown that constant exposure to the electromagnetic radio frequency (RF) emissions from cellular phone antennas has been linked to cancer, brain tumors, Alzheimer's disease, and other undesirable ailments. Thus, although people may enjoy communicating using their cellular phones, it is preferable to keep the cellular phone antennas as far away from them as possible. To this end, a wide range of solutions have already been provided. One, very prevalent solution, is to provide an external earpiece and microphone that are connected via a wire to the cellular phone. This device comes in various forms, ranging from an entire headset comprising earphones and a microphone for the user to wear over his head, to a tiny earpiece that the user may lodge in his ear, having a microphone that is either connected to the earpiece, or situated along the wire. During the conversation, the user may, therefore, hold the cellular phone at a distance from his body, or, at least from his head, in order to minimize exposure to the dangerous radiation.

However, these solutions have drawbacks associated with them. The headset is a bulky accessory that is not convenient to carry around, and is awkward and uncomfortable to wear. Although an earpiece is more compact, many people find that it is uncomfortable to have an earpiece lodged in their ear. Additionally, earpieces often provide poor sound quality for the user.

An additional disadvantage associated with both of the above-mentioned solutions is that both the headset and the earpiece require a wired connection to the cellular phone. The wire often gets tangled when in storage in one's pocket or bag, as well as during use. Moreover, if one mistakenly pulls the cellular phone too far away from the headset or earpiece, the wire may detach, or the earpiece may be pulled out of the user's ear, thereby losing the connection in the middle of a phone call until the wire or earpiece is properly replaced.

In order to solve the problems related to the wired connection, a relatively recently developed technology called Bluetooth may be utilized. Bluetooth is a wireless radio standard primarily designed for low power consumption, with a short range transceiver microchip in each communicating device. A Bluetooth chip is installed in the cellular phone and in the wireless earpiece. The user wears the earpiece (with microphone), which communicates with the cellular phone that may be situated at a distance from the user, and the cellular phone communicates with the nearest base station. Using Bluetooth, one still requires additional earpiece and microphone accessories, but not any connecting wires.

Nevertheless, some cell phone users prefer to hold the phone directly to their ear, without using unpleasant earphones.

US 2003/0232597 discloses a bluetooth cellular phone wherein the antenna is removed and replaced by a short range low energy wireless communication device, such as a Bluetooth chip. Instead of communicating with the cellular company's nearest base station, the cellular phone of US 2003/0232597 communicates with a proxy device, which is a transducer that transfers information to and from the cellular phone through another Bluetooth chip. The proxy devices also communicate, through a normal cellular antenna, with the cellular company's nearest cell or cells.

The above-mentioned solutions provide means for a cellular phone user to reduce his exposure to RF radiation by dividing the cellular phone into two devices, one with the antenna, and another with all of the remaining standard cellular phone features. Nevertheless, no solution has been provided for a user who prefers to hold his cellular phone during a phone call over using an earpiece, and who wants to avoid inconveniences involved with loss or theft of the device, as described above.

The level of RF radiation to which a passenger travelling on a public transportation vehicle such as a bus or train is additionally increased, often to a dangerous level, while many other passengers are also communicating by high-power communication.

It is therefore an object of the present invention to provide a communication system for reducing the inconveniences involved with loss or theft of a cellular phone.

It is an additional object of the present invention to provide a communication system for reducing exposure to radiation emitted from a cellular phone antenna, particularly travelling on a public transportation vehicle.

Additional objects and advantages of the present invention shall become apparent as the description proceeds.

SUMMARY OF THE INVENTION

The present invention relates to a communication system for communicating with a base station without being exposed to high-power radiation, comprising a plurality of mobile devices, each of which is configured to communicate over a cellular network by a high-power transceiver and to carry out low-power wireless communication with a low-power transceiver; a base station for transmitting and receiving high-power radio frequency (RF) signals upon demand; and a multi-channel hub device positioned in a public area and interfaceable with both said base station by high-power RF communication signals and with one or more of said mobile devices that have been detected upon entering said public area by low-power RF communication signals, wherein said hub device is operable to cause the high-power transceiver of each of said detected mobile devices to become disabled and to thereby allow each of said detected mobile devices to communicate transparently, over a corresponding communication channel established by said hub device, using high-power transmitting functions in a low power mode.

The term, "base station" as used herein refers to any suitable station for transmitting and receiving high-power communication signals that are able to propagate distances greater than one kilometer, and even hundreds or thousands of kilometers. When the signals propagate specifically over a cellular network, the base station is referred to as a "cellular base station", typically a tower but can be any station comprising at least one antenna mounted thereon, which emits RF electromagnetic radiation, and communicates with a cellular phone. When wireless communication is of "low power", the propagation of the RF signals is limited to a distance significantly less than one kilometer, generally below 300 meters.

The present invention is also directed to a method for communicating with a base station without being exposed to high-power radiation, comprising the steps of positioning in a public area a multi-channel hub device that is interfaceable with both a base station by high-power RF communication signals and with one or more of mobile devices by low-power RF communication signals; detecting when one or more of said mobile devices enters a public area; causing a high-power transceiver of each of said detected mobile devices to become disabled; determining which of said detected mobile devices is identifiable by a network identifier; registering said identifiable mobile devices; intercepting a communication request associated with each of said identifiable mobile devices; and allowing each of said identifiable mobile devices to communicate transparently over a corresponding communication channel established by said hub device, using high-power transmitting functions in a low power mode.

The present invention is also directed to a hub device for serving content to mobile devices, comprising a module for receiving and storing data associated with desired content; a low-power transceiver for communicating with each of a plurality of mobile devices located within a short range from said hub device; a multiplexer for establishing a plurality of communication channels; and a controller in data communication with said multiplexer and said module for receiving and storing data associated with desired content, for commanding transmission of user selected data with use of said a low-power transceiver over one of said established channels to a corresponding one of said plurality of mobile devices.

The present invention is also directed to a cellular communication system for a user, comprising one or more short-range phone interface units and a cellular hub device, each of said one or more short-range phone interface units comprising the following hardware: a transceiver for providing short-range wireless communication with said cellular hub device; a microphone; an earphone; a display; a keypad; and first circuitry and appropriate software for controlling the operation of said hardware and for establishing a short-range wireless communication channel to said cellular hub device;

said cellular cellular hub device comprising: a transceiver for establishing short-range wireless communication with said one or more short-range phone interface units; an antenna for transmitting and receiving high power radio frequency (RF) communication signals modulated with desired content to and from a cellular base station; second circuitry and appropriate software for establishing a high power RF communication channel between said cellular hub and said cellular base station, to allow communication of said content between each of said one or more short-range phone interface units and said cellular base station; a user identification module; and a memory for storing valuable information generated or received by said user, wherein all memory devices of each of said one or more short-range phone interface units are firmware memory devices which are interfaceable only with said first circuitry and appropriate software and in which said valuable information is not storable.

The present invention is defined by the claims, the contents of which are to be read as included within the disclosure of the specification, and will now be described by way of example with reference to the accompanying figures.

DETAILED DESCRIPTION OF THE PREFERRED EMBODIMENTS

Cellular phones typically contain information that is valuable to the owner, including contact information, memos, or even entire computer files. Loss or theft of the cellular phone, therefore, often means loss of all of the information stored therein. One embodiment of the present invention relates to a cellular communication system comprising a cellular phone interface that communicates with a hub device, which, in turn, communicates with a cellular base station. The hub device contains the cellular antenna, as well as circuitry and appropriate software components for establishing a communication channel between the hub and a base station, which, in conventional cellular phones, is found in the phone itself, and may be attached to a keychain, or stored in one's bag. Thus, if the cellular phone is lost or stolen, no valuable information is lost.

Figure 1A:
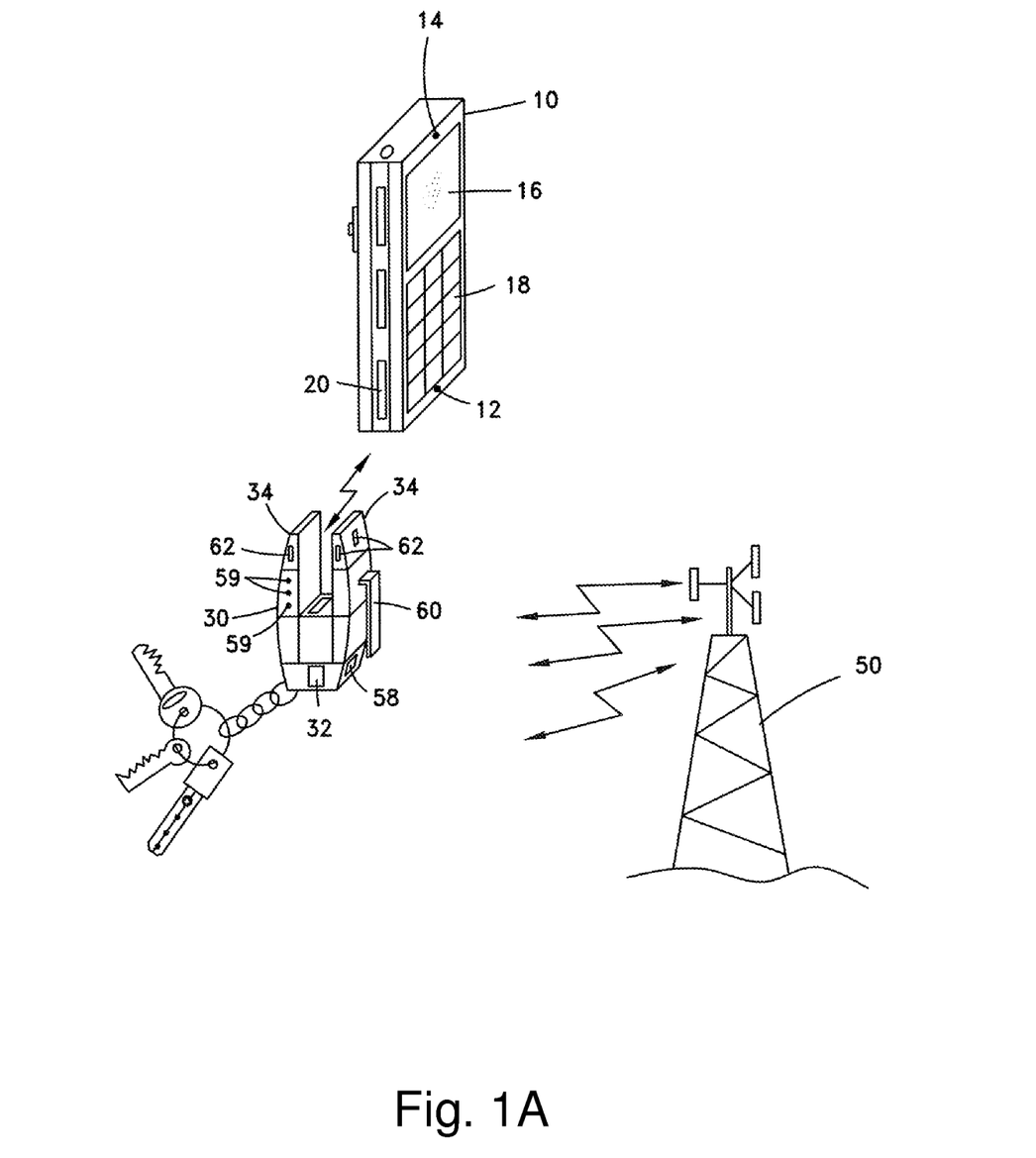
FIG. 1A illustrates an embodiment of the present invention, schematically showing the cell phone and wireless hub device of the present invention, in communication with each other as well as the hub device in communication with a cellular base station.

An embodiment of the present invention, shown schematically in FIG. 1A, comprises an interface, which, in this embodiment takes the form of a cellular phone (10), having a microphone (12), earphone (14), display (16), keypad (18) and a short range low energy wireless communication device, such as a Bluetooth transceiver (22). Wireless hub device (30) comprises the cellular phone's (10) antenna (34), circuitry and appropriate software components (not shown) for establishing a communication channel between hub (30) and a base station (50) and a Bluetooth transceiver (32). Hub (30) may be attached to a keychain (36) or necklace (not shown) for convenience.

Figure 1B:
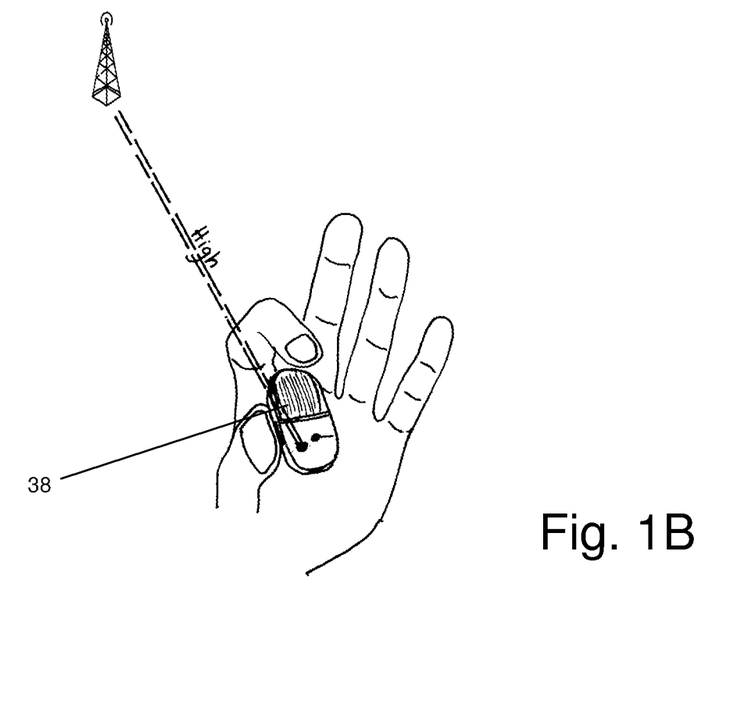
FIG. 1B illustrates a hand graspable hub device.
Figure 1C:
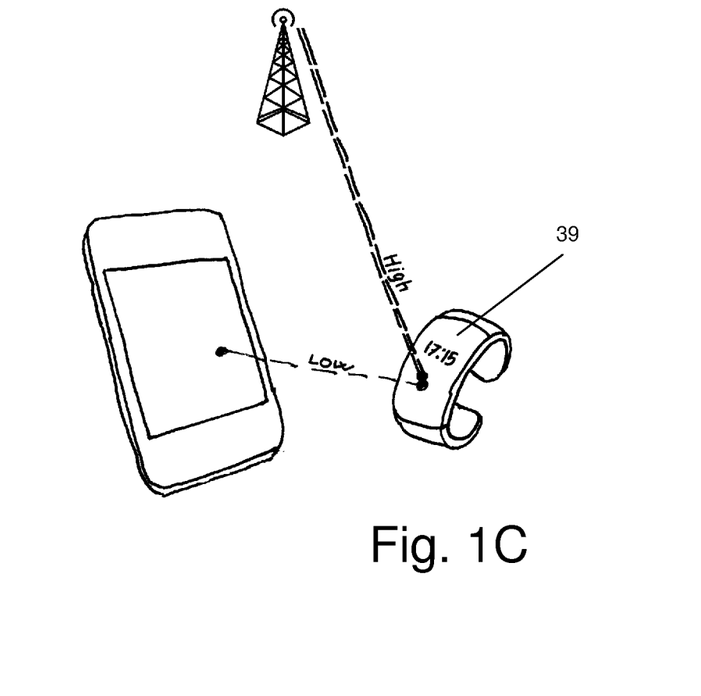
FIG. 1C illustrates a body engageable hub device.

Alternatively, the hub is body engageable by a bodily part distant from the user's head in order to minimize exposure to high-power radiation, for example small dimensioned hub (38) shown in FIG. 1B which is hand graspable and arcuate hub (39) shown in FIG. 1C which has flexible ends for engagement on the wrist or on a leg.

The hub device (30) circuitry and software components typically include the ROM and Flash memory chips, which provide storage for the hub device's operating system, and customizable features, such as the phone directory; the RF and power section, which handle power management and recharging; the RF amplifiers, which handle signals traveling to and from the antenna. Hub device (30) stores the System Identification Number (SID) and Mobile Identification Number (MIN) codes either in the internal memory, or on any identification chip or smartcard, such as a Subscriber Identification Module (SIM) card.

Cell phone (10) communicates with hub device (30) via Bluetooth low power RF transceiver (20), and hub device (30) transfers information to and from cell phone (10) via Bluetooth lower power RF transceiver (32), and to and from a cellular base station (50) via high power RF antenna (34). It should be noted that other methods of wireless communication, e.g. infrared, WiMax, and Wi-Fi can be employed with the present invention.

If cell phone (10) is lost or stolen, the owner does not lose any valuable information, as all valuable information is stored in hub device (30) and not in cell phone (10). As referred to herein, "valuable information" is non-executable stored data such as contact lists, pictures, stored messages, video files, and audio files.

Cell phone (10), or any other phone interface unit, is configured only with non-writable memory, such as firmware memory, in which is stored the cell phone's operating system. Valuable information is therefore not storable in cell phone (10). Cell phone (10) is therefore replaceable and inexpensive, as it lacks any information that is of value to a user.

Since hub device (30) is not required to be regularly removed and replaced to and from its storage location, as described above, the chances of losing hub device (30) are much lower than that of losing the cell phone (10) itself.

Additionally, and importantly, since the cell phone antenna is separated from the cell phone itself, the radiation that the user is exposed to is greatly reduced.

According to one embodiment of the present invention, hub device (30) is water proof.

According to another embodiment of the present invention, hub device (30) is enclosed by RF shielding material for allowing only directional electromagnetic radiation to exit the hub (30), and preventing multidirectional radiation.

Different embodiments of the invention can be provided having one or more of the following features available on either the phone, the hub device, or both:

Expandable memory that allows for synchronization of the information entered on either the phone or hub to be stored in the memory of both devices, so that the loss of one of them does not mean the loss of valuable information such as lists of contacts, diary, etc.;

Vibration option;

Software, e.g. APPS, games, MP3, caller ID, ringtones, wed browser, MMS/MME;

Camera; and

FM radio.

Figure 2:
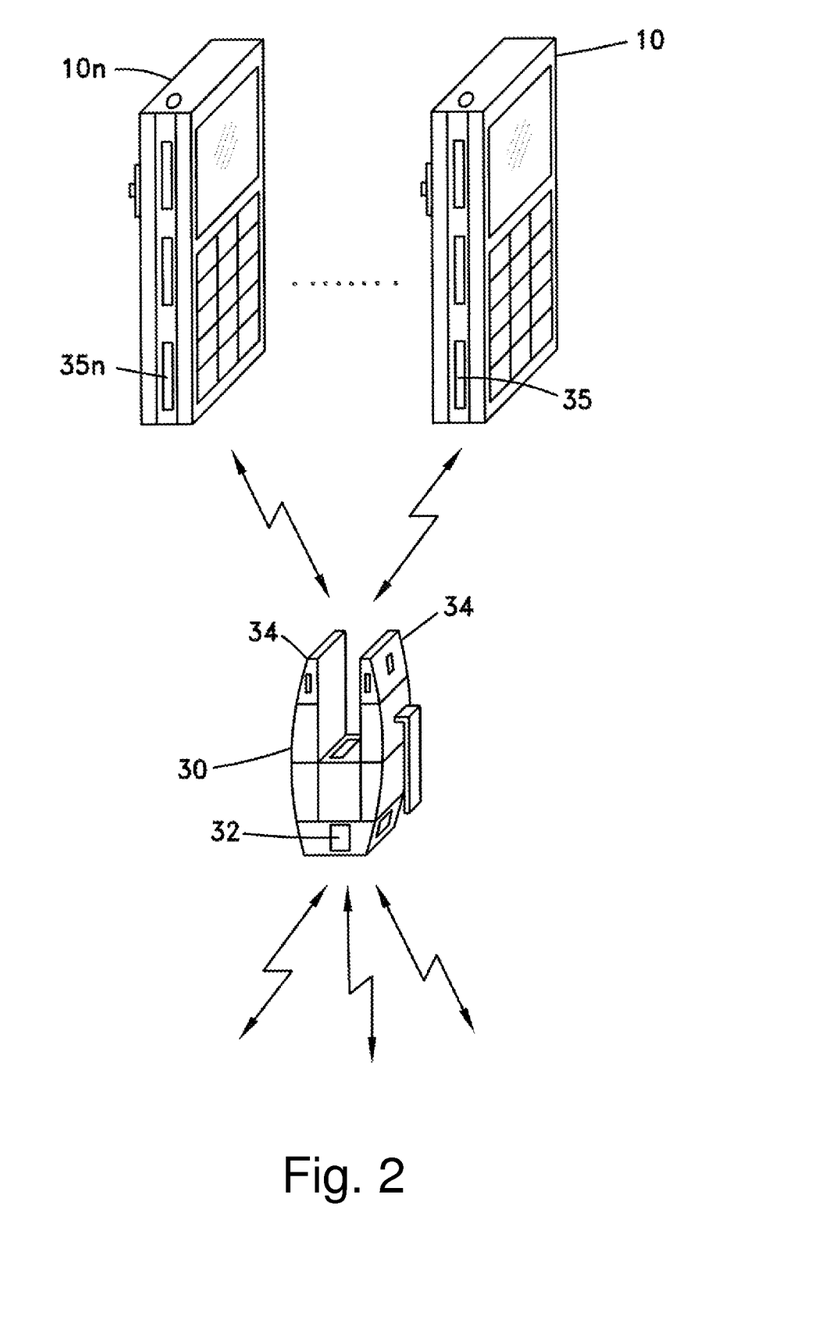
FIG. 2 illustrates an additional embodiment of the present invention, wherein a secondary identification card is provided in the cell phone for transmitting a unique identification code to the hub device.

Optionally, cellular phone (10) further comprises a secondary identification card (35), as shown in FIG. 2, such as a SIM card or identification chip for providing a unique identification code or personal identification number (PIN) that is required for authenticating communication with hub (30). The code may be automatically transmitted to hub (30), or the user may be prompted to input his PIN before dialing. Additional cellular phones (10n) may be provided with a unique identification card (35n) for enabling communication with a single hub (30). This feature allows multiple users to share information, such as video or audio data, games, etc., via hub (30). Additionally or alternatively, a secure communication channel may be provided, for instance, by sending encrypted signals.

Figure 3:
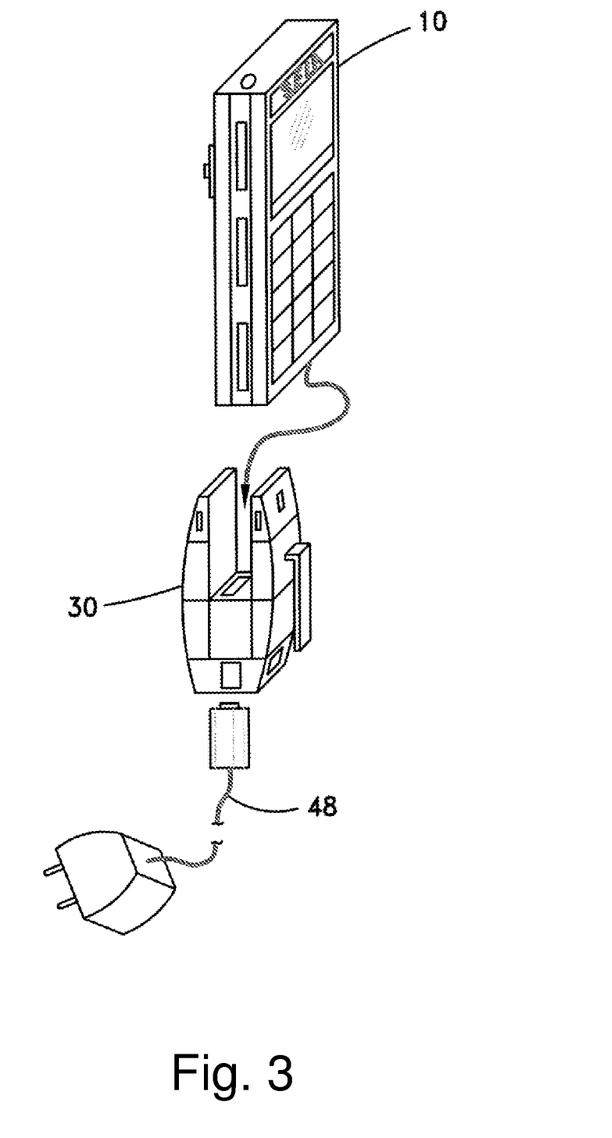
FIG. 3 illustrates the cell phone and hub device capable of being recharged while joined to each other.

Cell phone (10) and hub device (30) may be each rechargeable individually, as a stand-alone device, and/or they may be recharged as a unit, for example, as shown in FIG. 3, wherein charging plug (48) is removably connected to hub device (30), which, in turn, is connected to cell phone (10). Additionally, hub device (30) may be utilized to charge cell phone (10) or vice versa via an internal or external charging source. Hub device (30) may remain attached to cell phone (10) during non-use, and detached therefrom when using cell phone (10).

At least one additional memory card may be removably inserted to hub (30) for increasing the storage and/or memory capabilities of the system.

With reference to FIG. 1A, cell phone (10) and/or hub device (30) may additionally comprise additional ports (58), (59), including USB, fire wire, audio in/out, video in/out, headphone, microphone, etc. for inserting external hardware components thereto, as well as appropriate control buttons (62) for performing desired operations.

If cell phone (10) is misplaced amongst one's belongings, by pressing a button on hub device (30), a signal is transmitted to cell phone (10), which, in turn, causes a beeping or ringing noise to be sounded from cell phone (10). A similar operation may be performed on cell phone (10) if hub device (30) is misplaced.

According to another embodiment of the present invention, each of the cellular phone (10) and hub device (30) is capable of communicating with other Bluetooth containing devices, such as a television or computer.

Optionally, hub device (30) additionally comprises a coupling mechanism such as a clip (60) for removably attaching to a belt, shirt or purse, or to any other convenient accessory.

Hub device (30) may be configured without user interfaceable hardware such as a microphone, earphone, display and keypad. Accordingly, hub device (30) may be advantageously mounted in a region inaccessible to a user, to minimize exposure to radiation.

Figure 4:
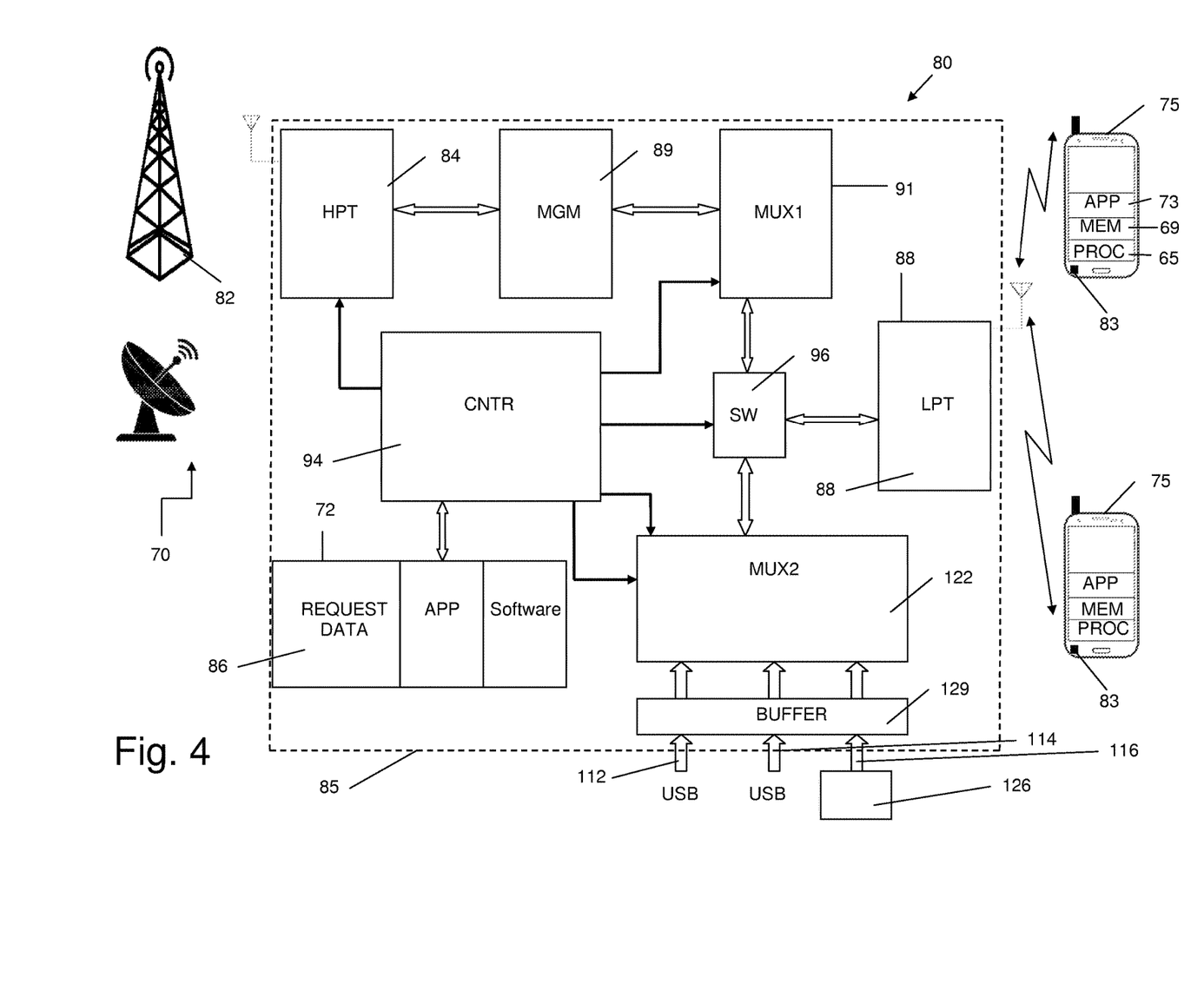
FIG. 4 is a block diagram of a communication system according to another embodiment of the invention.
Figure 5A:
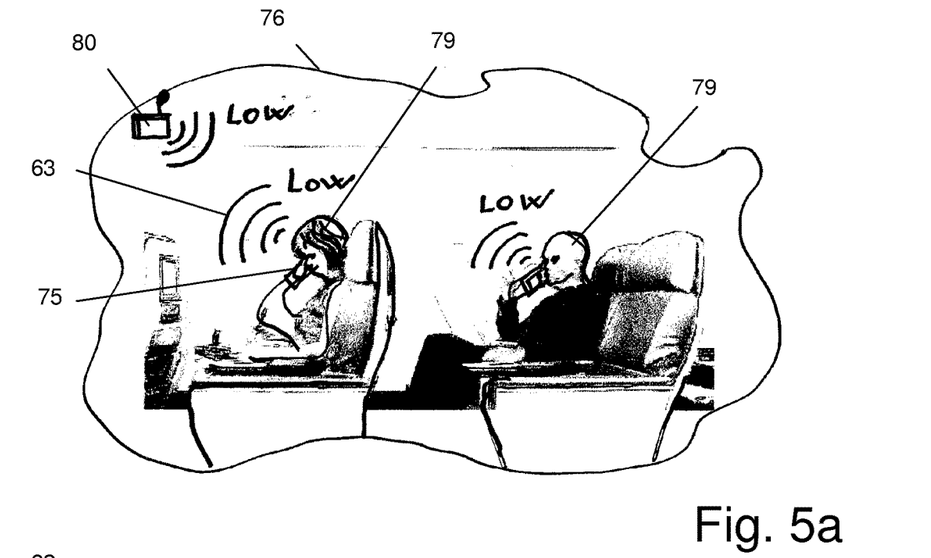
FIGS. 5a-e schematically illustrate five implementations, respectively, of the communication system of FIG. 4.
Figure 5B:
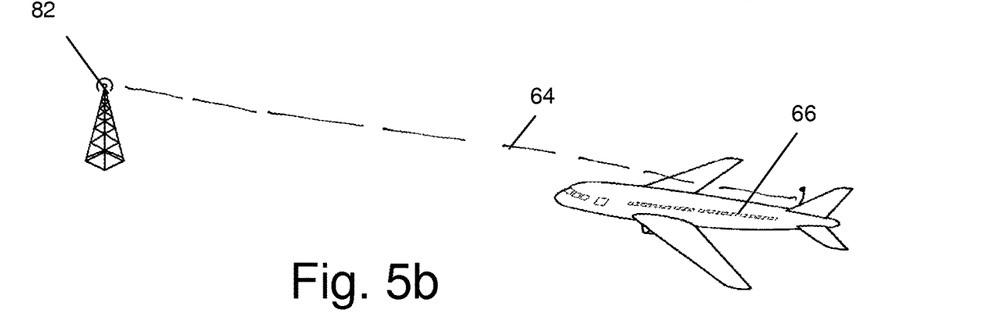
Figure 5C:
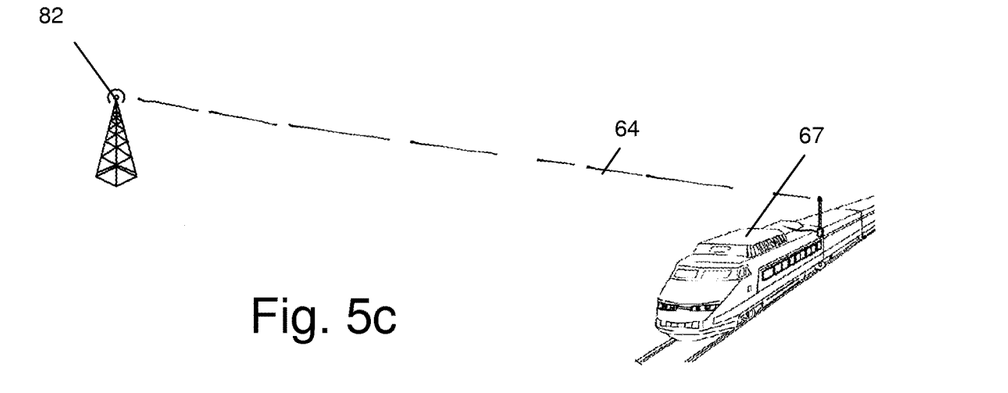
Figure 5D:
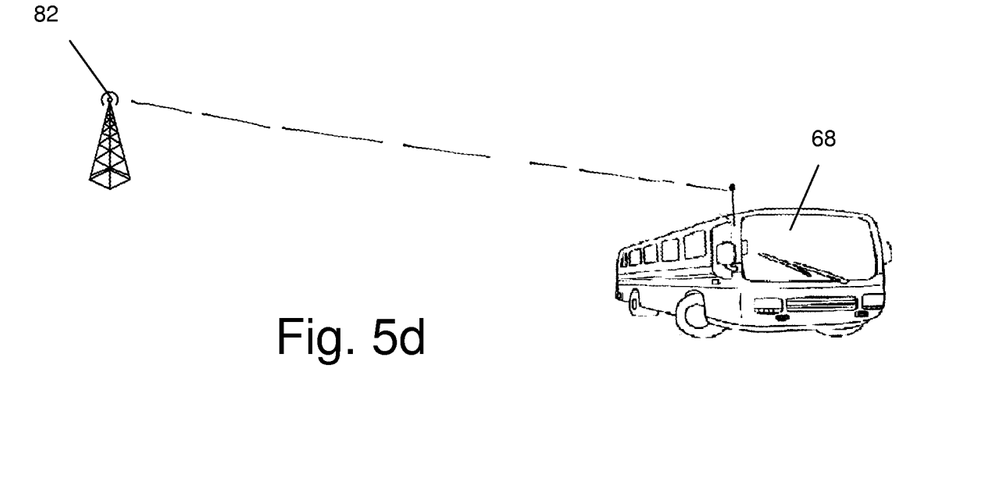
Figure 5E:
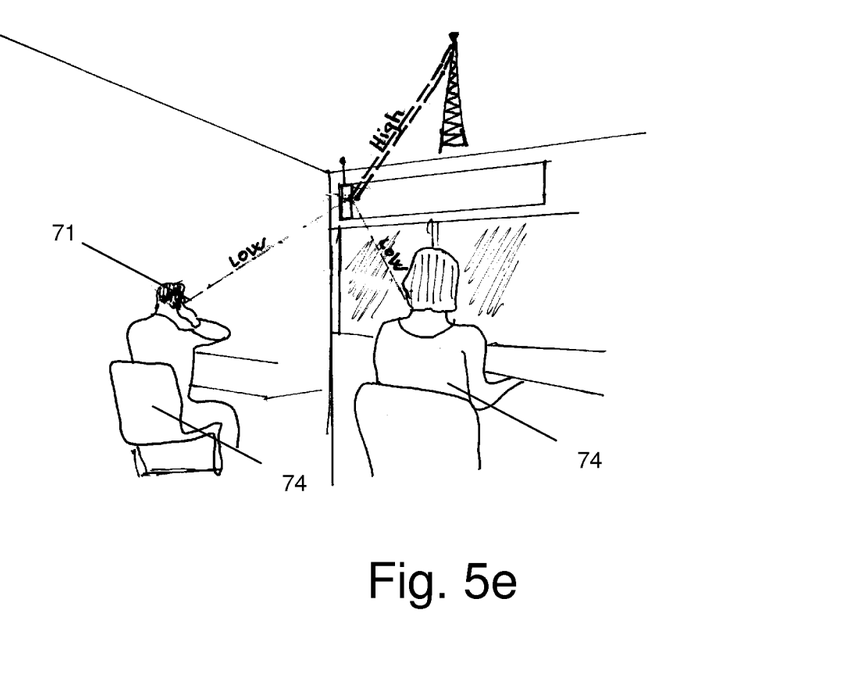

FIG. 4 illustrates another embodiment of the invention wherein communication system (70) comprises a multichannel hub device (80) for wirelessly communicating with a base station (82) via high-power RF communication signals and is positioned in a public area, so that a plurality of mobile device users located in the public area are able to communicate simultaneously with the base station by means of the hub device without being exposed to the high-power radiation.

In this embodiment, mobile device (75) is suitable for conducting either high-power wireless communication with a high-power transceiver (81) or low-power wireless communication with a low-power transceiver (83). Mobile device (75) generally is a smartphone with a programmable memory device (69) in which valuable information is storable and a processor (65) for executing instructions stored in memory device (69), but may be any other electronic device that has wireless communication functionality. A client application (73) stored in memory device (69) is used to initiate a low power mode, whereby high-power transceiver (81) is disabled by processor (65) and communication links subsequently carried out by mobile device (75) are transmitted via low-power transceiver (83) and hub device (80) to base station (82).

Processor executable software module (77) which is stored in memory device (72) of hub device (80) automatically initiates pairing and registration events when mobile device (75) is located within the public area and is spaced less than a predetermined distance from hub device (80). Following the pairing and registration events, the user of mobile device (75) is able to communicate while in the low power mode with another user by means of hub device (80) and base station (82), after a communication request associated with mobile device (75) has been intercepted by hub device (80), without being exposed to high-power radiation. Despite operating in the low power mode, all high-power transmitting functions of mobile device (75), including voice, text and multimedia reception and transmission, as well as web browsing capabilities, may continue transparently and with privacy as if the user were communicating without intervention of hub device (80).

FIGS. 5a-e illustrate various implementations of communication system (70). Hub device (80) may be mounted to the ceiling (76), or to any other suitable structural element, of a public area (78) in which passengers (79) of an airplane (66), train (67), bus (68), or any other public transportation vehicle are located. If the vehicle is sufficiently large, more than one hub device (80) may be employed to provide increased coverage. Passengers (79) may hold their mobile device (75) close to their ear for extended periods of time without fear of being exposed to high-power radiation as a low-power communication link (63) is established between each mobile device (75) and hub device (80), and a high-power communication link (64) is established between hub device (80) and base station (82). Base station (82) is generally a cellular base station, but may also be a satellite dish, or even a satellite when the vehicle is an airplane (66), to allow passengers (79) to communicate during a flight without having to set their mobile devices (75) to a flight mode as the communication link does not constitute a safety risk to the airplane.

The public area in which hub device (80) is mounted may also be a work place (71), to provide workers (74) with simultaneous low-power communication capabilities.

As shown in FIG. 4, hub device (80) communicates with base station (82) by means of high-power transceiver (HPT) (84) and with a mobile device (75) found to be in proximity therewith by means of low-power transceiver (LPT) (88). A multiprotocol gateway module (MGM) (89) interfaces between HPT (84) and LPT (88), to support low-power transmission from mobile device (75) to hub device (80) over one of many different protocols, such as Bluetooth, WI-Fi, and WiMAX. A first multiplexer (91) connected to MGM (89) is used to establish a plurality of channels, a channel between each mobile device (75) made accessible to a signaling connection and base station (82), under the command of controller (94). A switch (96) may be connected to LPT (88), first multiplexer (91) and controller (94).

Figure 6:
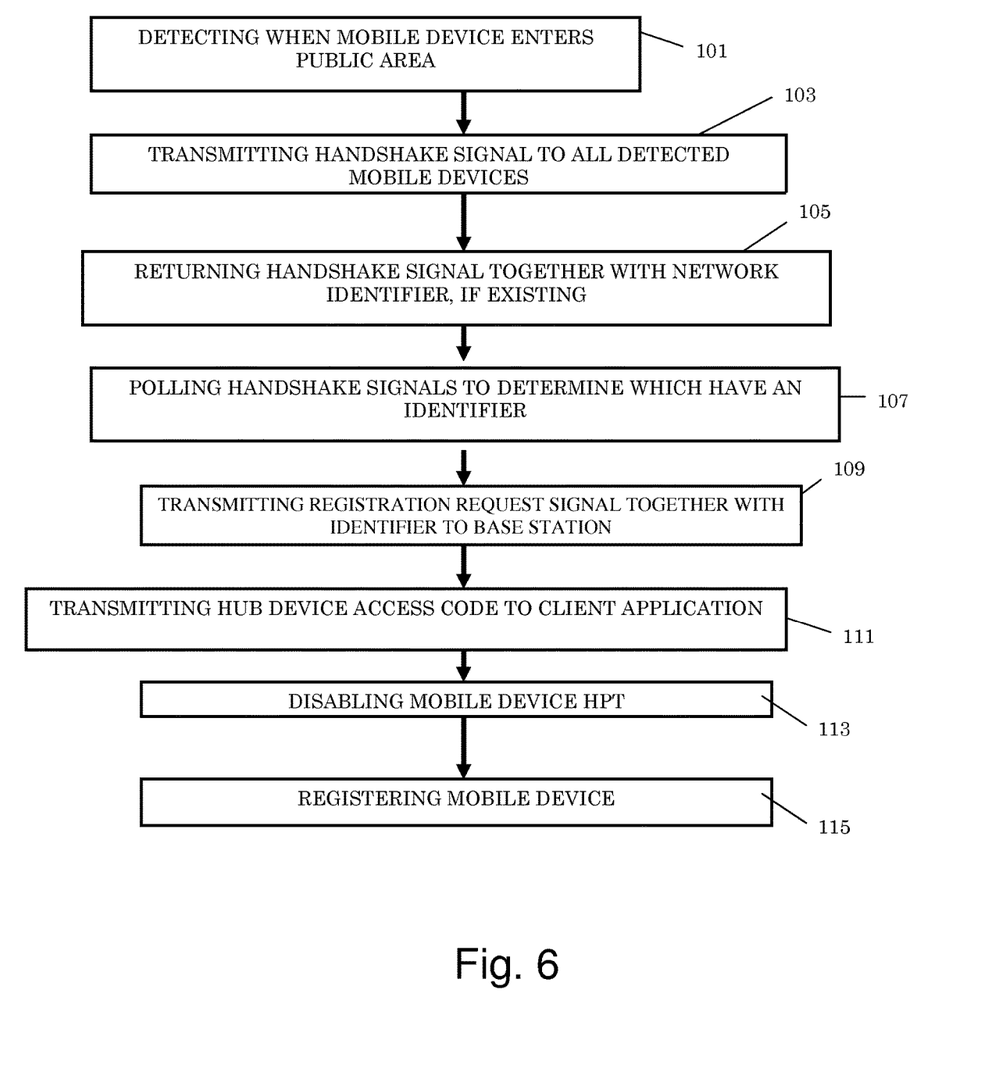
FIG. 6 is a flow diagram of a method for setting a detected mobile device to a low power mode.

In use, as illustrated in FIG. 6, the hub device's LPT detects when a mobile device enters the public area in step (101), such as when the signal strength emitted by the mobile device's LPT is greater than a predetermined threshold, and then transmits a handshake signal to all detected mobile devices in step (103). All of those detected mobile devices that have been set to an automatic networking access state return the handshake signal in step (105) to the hub device's LPT, together with SIM card data of the detected mobile device, if existing. The hub device's software module polls the received handshake signals in step (107) to determine which are provided with SIM card data. The hub device's controller then commands its HPT to transmit the SIM card data via a corresponding registration request signal to the base station in step (109). Simultaneously with the transmission of the registration request signal, the hub device's software module transmits a hub device access code in step (111) to the client application of each mobile device found to have SIM card data, whereupon the client application transmits a disable signal to the mobile device's HPT in step (113), thereby initiating the low power mode. The mobile device is consequently registered and set to the low power mode in step (115).

Figure 7:
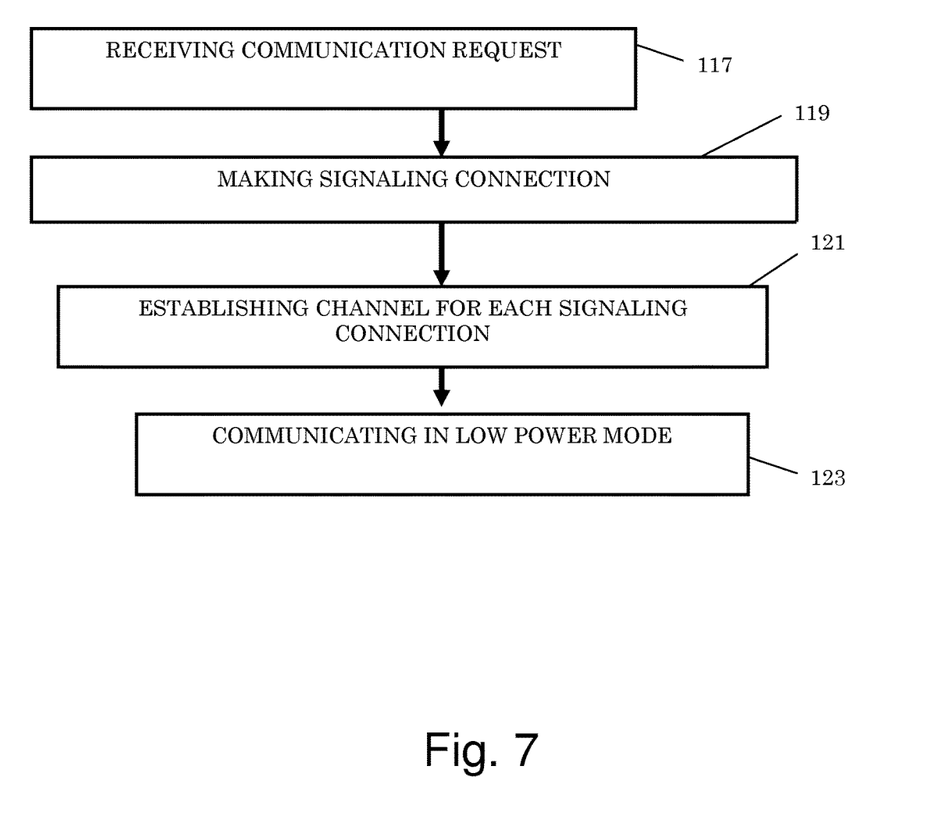
FIG. 7 is a flow diagram of a method for communicating in the low power mode.

As shown in FIG. 7, when a communication request intended for the mobile device is received at the base station in step (117), the base station transfers the communication request to the hub device as a result of the previously performed registration process and a signaling connection is made at the MGM in step (119), simultaneously with the making of other signaling connections intended to transfer a communication request to other mobile devices located in the same public area. The first multiplexer in turn establishes a corresponding communication channel in step (121) for each signaling connection, from the MGM to each mobile device to the mobile device intended to respond to the signaling connection. The user of the mobile device responds to the signaling connection in step (123) such that wireless communication is carried out in the low power mode via the base station and the hub device.

Similarly when the user of the mobile device initiates a communication request, the hub device transfers the communication request to the base station as a result of the previously performed registration process, and a signaling connection is made at the MGM with the interaction of the first multiplexer, simultaneously with the making of other signaling connections initiated by other mobile devices located in the same public area.

It will be appreciated that some of the communication channels that are established simultaneously at the MGM may be directed from the base station to the hub device, and some may be directed from the hub device to the base station.

Whenever desired, the user of a mobile device (75) may terminate, or inhibit if not in use, the low power mode, in order to communicate in a high power mode.

Returning back to FIG. 4, hub device (80) in one embodiment is adapted to serve desired content to one or more mobile devices (75) located within the public area upon demand, without interaction of the base station. In addition of being advantageous to passengers of a public transportation vehicle as exposure to high-power radiation and the cost of connection to a base station are avoided, this feature is also of great utility to a large number of users who need to receive the same content simultaneously, such as the audience of a lecture or guests at a hotel.

A second multiplexer (122) in data communication with controller (94) and switch (96) is used to serve the desired content. When an external hardware component (126), such as a portable flash drive or a DVD, TV or audio player, is coupled to one of the USB ports, e.g. ports (112), (114) and (116), provided with hub device casing (85), data associated with the content to be served is transmitted to buffer (129), or to any other suitable storage medium. A hardware component (126) may be coupled to each of the USB ports, to increase the amount of data that is available to users.

After a content request is submitted from a mobile device (75), following selection of desired content from a menu, hub device LPT (88) transfers the request to controller (94). Controller (94) in turn commands switch (96) to become disconnected from first multiplexer (91) and to become connected to second multiplexer (122). Since mobile device (75) has already been registered as illustrated in FIG. 6, controller (94) commands second multiplexer (122) to receive the data associated with the selected content from buffer (129) and to establish a communication channel over which the data is to be transmitted to mobile device (75) via hub device LPT (88). The data associated with all content requests may be stored in module (86) of memory device (72).

A mobile device (75) may also upload content from its memory device (69) to buffer 129 via hub device LPT (88), second multiplexer (122) and controller (94), to be served to other mobile devices upon demand. Second multiplexer (122) may be bidirectional.

Switch (96) may be configured as a combiner, so that wireless communication may be carried out by means of base station (82) and first multiplexer (91) at the same time that wireless communication is carried out by means of second multiplexer (122) and buffer (129).

If so desired, the hub device may be dedicated solely to serve desired content, and therefore may be configured without the first multiplexer. Alternatively, the hub device may provide a mobile device with high-power transmitting functions in a low power mode, but not content serving functions, and therefore may be configured without the second multiplexer.

Figure 8:
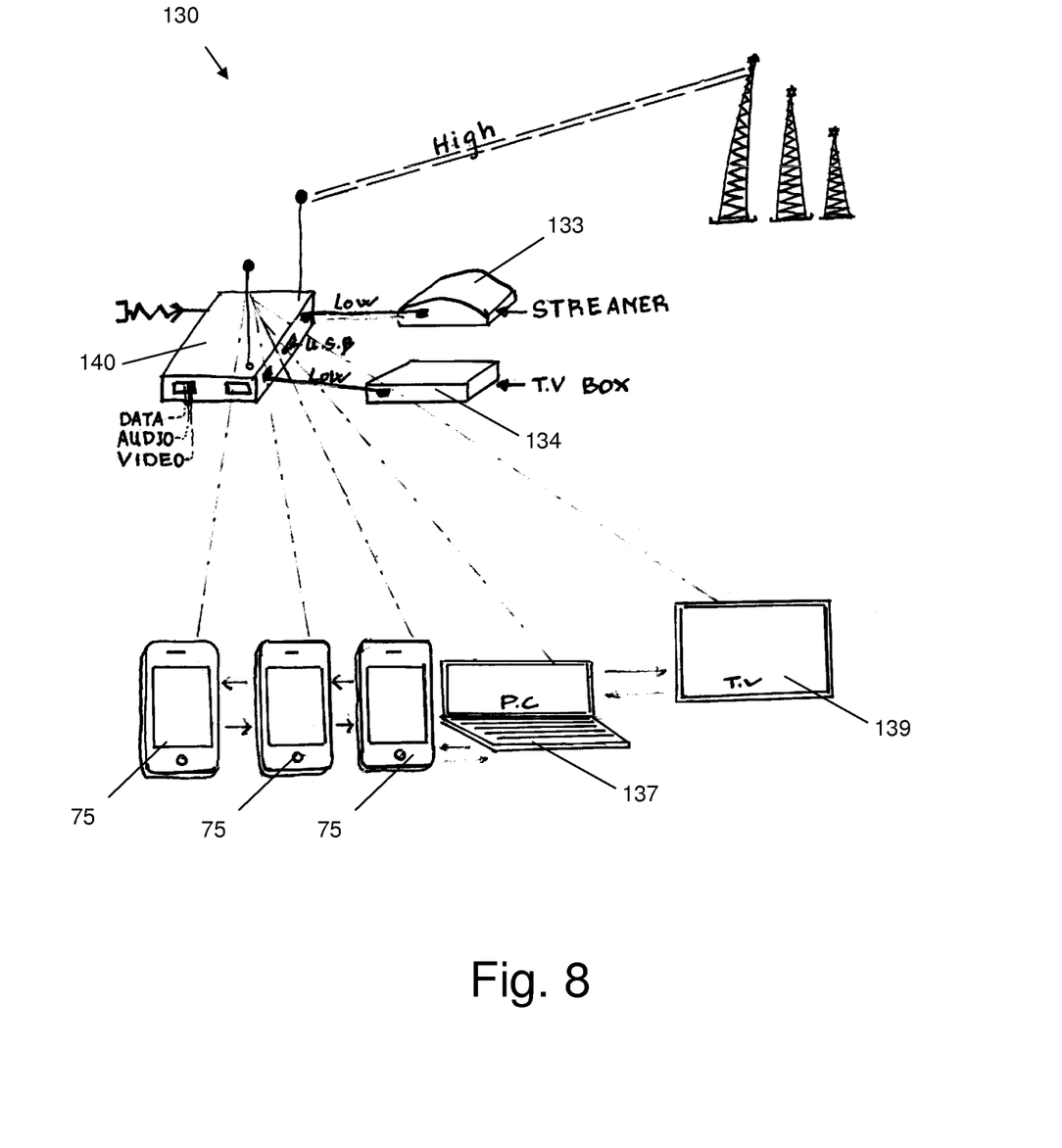
FIG. 8 is a schematic illustration of a communication system according to another embodiment of the invention.

FIG. 8 illustrates an implementation of a content serving communication system (130). Communication system (130) comprises hub device (140), which is similar to hub device (80) of FIG. 4, but without the first multiplexer. Streaming device (133) for inputting content from an Internet-based content source and set-top box (134) for inputting media content from a content source are coupled to corresponding USB ports of hub device (140). The HPT of hub device (140) is also able to receive content from base station (82), such as music, video and multimedia. The received content is able to be served to various processor enabled devices, such as a mobile device (75) normally configured for communication over a cellular network, a personal computer (137) for example a laptop or tabletop computer, and a smart television (139), after the processor enabled device has been registered by hub device (140). A second processor enabled device which was not served with content may interact with a first processor enabled device which was served with content in order to receive the previously served content.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A communication system for communicating with a base station without being exposed to high-power radiation, comprising:
   a) a plurality of mobile devices, each of which is configured to communicate over a cellular network by a high-power transceiver and to carry out low-power wireless communication with a low-power transceiver;
   b) a base station for transmitting and receiving high-power radio frequency (RF) signals upon demand; and
   c) a multi-channel hub device positioned in a public area and interfaceable with both said base station by high-power RF communication signals and with said plurality of mobile devices by low-power RF communication signals, said multi-channel hub device being operable to:
      i. detect an entry of one or more of said plurality of mobile devices into said public area upon determining that the mobile devices are spaced less than a predetermined distance from said hub device;
      ii. cause a high-power transceiver of each of said detected mobile devices to become automatically disabled following detection; and
      iii. initiate a pairing operation with each of said detected mobile devices to facilitate subsequent transparent communication using high-power transmitting functions in a low power mode over a corresponding communication channel to be established by said hub device.

2. The system according to claim 1, wherein a software module stored in a memory device of the hub device and commanded by a controller is operable to initiate pairing and registration events with respect to each of the plurality of mobile devices that has been detected.

3. The system according to claim 2, wherein the hub device comprises a high-power transceiver for communicating with the base station, a low-power transceiver for communicating with each of the detected mobile devices, and a gateway module for interfacing between said hub device high-power transceiver and said hub device low-power transceiver and for making a signaling connection associated with a communication request transferred to the hub device, the corresponding communication channel being established for the signaling connection.

4. The system according to claim 3, wherein the hub device further comprises a multiplexer which is electrically connected to the gateway module, for establishing a plurality of communication channels under command of the controller.

5. The system according to claim 4, wherein the multiplexer is a multiprotocol multiplexer.

6. The system according to claim 4, further comprising an external hardware component which is coupleable to an USB port provided with the hub device, the hub device further comprising an additional multiplexer in data communication with the controller, for serving desired content from said external hardware component to one or more of the detected mobile devices.

7. The system according to claim 6, further comprising a switch in data communication with the controller and the hub device low-power transceiver, and switchably connected with both the multiplexer and the additional multiplexer.

8. The hub device according to claim 1, wherein the hub device is operable to make a plurality of signaling connections so as to be connected simultaneously with at least two of said detected mobile devices while allowing each of said at least two of said detected mobile devices to communicate transparently and independently over the corresponding communication channel established by the hub device.

9. The hub device according to claim 1, wherein the hub device is operable to detect that the one or more of the mobile devices is spaced less than the predetermined distance from said hub device when a signal strength emitted by the mobile device low-power transceiver is greater than a predetermined threshold.

10. A method for communicating with a base station without being exposed to high-power radiation, comprising the following steps performed by a multi-channel hub device positioned in a public area and interfaceable with both a base station by high-power radio frequency (RF) communication signals and with a plurality of mobile devices by low-power RF communication signals:
   a. detecting when two or more of said mobile devices enter a public area upon determining that the mobile devices are spaced less than a predetermined distance from said hub device;
   b. causing a high-power transceiver of each of said detected mobile devices to become automatically disabled following detection;
   c. determining which of said detected mobile devices is identifiable by a network identifier;
   d. initiating a pairing operation with each of said detected mobile devices by registering said identifiable mobile devices;
   e. intercepting a communication request associated with each of said identifiable mobile devices; and
   f. making a plurality of signaling connections so as to be connected simultaneously with each of said registered mobile devices while allowing each of said registered mobile devices to communicate transparently and independently over a corresponding communication channel established by said hub device, using high-power transmitting functions in a low power mode.

11. A hub device for serving content to mobile devices, comprising:
   a module for receiving and storing data associated with desired content;
   a low-power transceiver for communicating with each of a plurality of mobile devices located within a short range from said hub device;
   a multiplexer for establishing a plurality of communication channels; and
   a controller in data communication with said multiplexer and said module for receiving and storing data associated with desired content, for commanding transmission of user selected data with use of said a low-power transceiver over one of said established channels to a corresponding one of said plurality of mobile devices;
   wherein said hub device is positioned in a public area and is operable to:
      i. detect an entry of one or more of said plurality of mobile devices into said public area upon determining that the mobile devices are spaced less than a predetermined distance from said hub device;
      ii. cause a high-power transceiver of each of said detected mobile devices to become automatically disabled following detection; and
      iii. initiate a pairing operation with each of said detected mobile devices to facilitate subsequent transparent communication of said data associated with desired content over a corresponding low-power communication channel to be established.

12. The hub device according to claim 11, wherein an external hardware component for generating the data is coupleable to an USB port provided with the hub device.

13. The hub device according to claim 11, further comprising a high-power transceiver by which the data is receivable from a base station.

14. The hub device according to claim 11, wherein the data is transmittable to one or more of said plurality of mobile devices in which all memory devices thereof are firmware memory devices, wherein contact and diary information is not stored in said firmware memory devices.

15. The system according to claim 11, wherein the hub device is operable to make a plurality of signaling connections so as to be connected simultaneously with at least two of said detected mobile devices while allowing each of said at least two of said detected mobile devices to communicate transparently and independently over the corresponding communication channel established by the hub device.

16. A cellular communication system for a user, comprising one or more short-range phone interface units and a cellular hub device,
   a) each of said one or more short-range phone interface units comprising the following hardware:
      i. a transceiver for providing short-range wireless communication with said cellular hub device;
      ii. a microphone;
      iii. an earphone;
      iv. a display;
      v. a keypad; and
      vi. first circuitry and software for controlling the operation of said hardware and for establishing a short-range wireless communication channel to said cellular hub device;
   b. said cellular hub device comprising:
      i. a transceiver for establishing short-range wireless communication with said one or more short-range phone interface units;
      ii. an antenna for transmitting and receiving high power radio frequency (RF) communication signals modulated with desired content to and from a cellular base station;

iii. second circuitry and software for establishing a high power RF communication channel between said cellular hub and said cellular base station, to allow communication of said content between each of said one or more short-range phone interface units and said cellular base station;

iv. a user identification module; and v. a memory for storing contact and diary information generated or received by said user, wherein all memory devices of each of said one or more short-range phone interface units are firmware memory devices which are interfaceable only with said first circuitry and software and in which said contact and diary information is not stored.

17. The system according to claim 16, wherein each of the one or more short-range phone interface units further comprises a secondary identification card for providing a unique identification code for authenticating communication of the one or more short-range phone interface units with the cellular base station via the cellular hub device.

18. The system according to claim 17, wherein the secondary identification card is a subscriber identity module (SIM) card.

19. The system according to claim 16, wherein two or more short-range phone interface units, each comprising a secondary identification card, share information exchanged with the cellular base station via a single cellular hub device.

20. The system according to claim 19, wherein the information exchanged with the cellular base station is video or audio data.

21. The system according to claim 16, wherein the second circuitry and software is also operable for establishing a high power RF communication channel between the cellular hub device and the cellular base station, for communication of signals not modulated with the content between the one or more short-range phone interface units and the cellular base station.

22. The system according to claim 16, wherein the one or more short-range phone interface units is removably connected to the cellular hub device, the cellular hub device comprising additional ports for performing desired operations as a single integral unit.

* * * * *